(12) United States Patent
Abou-Emara

(10) Patent No.: US 8,326,903 B2
(45) Date of Patent: Dec. 4, 2012

(54) SYSTEM AND METHOD FOR IMPROVED VECTOR ANALYSIS

(75) Inventor: Luai A. Abou-Emara, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1371 days.

(21) Appl. No.: 11/969,282

(22) Filed: Jan. 4, 2008

(65) Prior Publication Data
US 2009/0175386 A1    Jul. 9, 2009

(51) Int. Cl.
    *G06F 7/38* (2006.01)
(52) U.S. Cl. .................... 708/230; 375/340
(58) Field of Classification Search .......... None
    See application file for complete search history.

(56) References Cited

U.S. PATENT DOCUMENTS

| | | | |
|---|---|---|---|
| H1291 H | 2/1994 | Hinton et al. | |
| 5,560,025 A | 9/1996 | Gupta et al. | |
| 5,761,467 A | 6/1998 | Ando | |
| 5,978,825 A * | 11/1999 | Divine et al. | 708/525 |
| 6,246,347 B1 * | 6/2001 | Bakhmutsky | 341/67 |
| 6,742,111 B2 | 5/2004 | Soni | |
| 7,069,284 B2 * | 6/2006 | Peting | 708/300 |
| 2002/0165887 A1 * | 11/2002 | Rogenmoser et al. | 708/211 |
| 2005/0228846 A1 * | 10/2005 | Murray | 708/671 |
| 2007/0143579 A1 | 6/2007 | Shih et al. | |

FOREIGN PATENT DOCUMENTS

| | | | |
|---|---|---|---|
| DE | 4434529 A1 | 4/1995 | |
| JP | 404175928 A1 | 6/1992 | |

* cited by examiner

*Primary Examiner* — Chat Do
*Assistant Examiner* — Michael D Yaary
(74) *Attorney, Agent, or Firm* — Patrick E. Caldwell, Esq.; The Caldwell Firm, LLC

(57) ABSTRACT

A system includes a "found two" module configured to receive an n-bit vector and to generate a "found two" signal indicating whether there are at least two bits of the n-bit vector in a predetermined state. The system also includes a "one's hot" module coupled to the "found two" module. The "one's hot" module is configured to generate, concurrently with the "found two" module, a first one's hot vector (OHV) based on the received n-bit vector. In one embodiment, the system and method indicate whether an input n-bit vector contains at least two high bits.

15 Claims, 4 Drawing Sheets

FIG. 1

(PRIOR ART)

SYSTEM AND METHOD FOR IMPROVED VECTOR ANALYSIS

TECHNICAL FIELD

The present invention relates generally to the field of computer processor architecture and parallel processing and, more particularly, to a system and method for improved vector analysis.

BACKGROUND OF THE INVENTION

Modern electronic computing systems, such as microprocessor systems, typically include processors configured to perform various computing tasks. Computer processors often include a registry file that includes a plurality of registers and holds the data employed in the various computing tasks. The processor moves data into and out of the registers in accordance with instructions that are based on high-level language instructions provided by a user or programmer.

Some computer systems employ a vector to track whether registers in the registry file are available to receive data. That is, the vector indicates whether a particular register is already in use, whether locked or holding data. In some computer systems, the vector comprises a plurality of ordered bits, wherein each bit is set to zero if the associated register is unavailable or set to one if the associated register is available to receive data. In other systems, each register includes a "free" bit indicating whether the register is available to receive data. In such systems, there are various methods to construct a vector from the "free" bits, as one skilled in the art will understand.

In earlier systems, registry files were relatively small, and operated in an environment where, on average, at most only one instruction issued each clock cycle. Generally, the trend in industry today is to provide processors with larger and larger registry files, in order to support more complex instructions and register renaming conventions. As registry files increase in size, the amount of time needed to find a free registry, and the number of entries required per cycle for register renames, increases as well. This increase is particularly noticeable when two empty registers need to be found. In this case, searching for empty registers one at one time is both inefficient and time consuming.

In order to decrease the amount of time needed to find an empty registry entry, that is, an empty register, programmers have sought to develop a suitable algorithm that will search for two empty registers at one time. One method commonly used divides a large registry file into two smaller blocks. This method searches each block simultaneously for one empty register each. Upon finding a free entry in one or both of the smaller blocks, this method constructs a one-hot vector to show the position of the free entry and raises a signal, "found one."

But this method suffers from a significant disadvantage. Specifically, a problem occurs with this method when empty registers exist only in one of the two blocks, such as, for example, when one of the two blocks experiences high demand that results in no free entries in that block. In this case, the algorithm reports only one empty register location, even though more than one register may be available in the block.

To overcome this disadvantage, a somewhat improved, "intuitive" method searches a single block for two empty registers. In particular, the intuitive method attempts to identify two free entries in a single block, thereby increasing the yield of free entries. The intuitive approach attempts to spend the same amount of time searching for two free entries in a single block that would be spent using the earlier methods for searching for a single free entry in two blocks.

Figure 1:
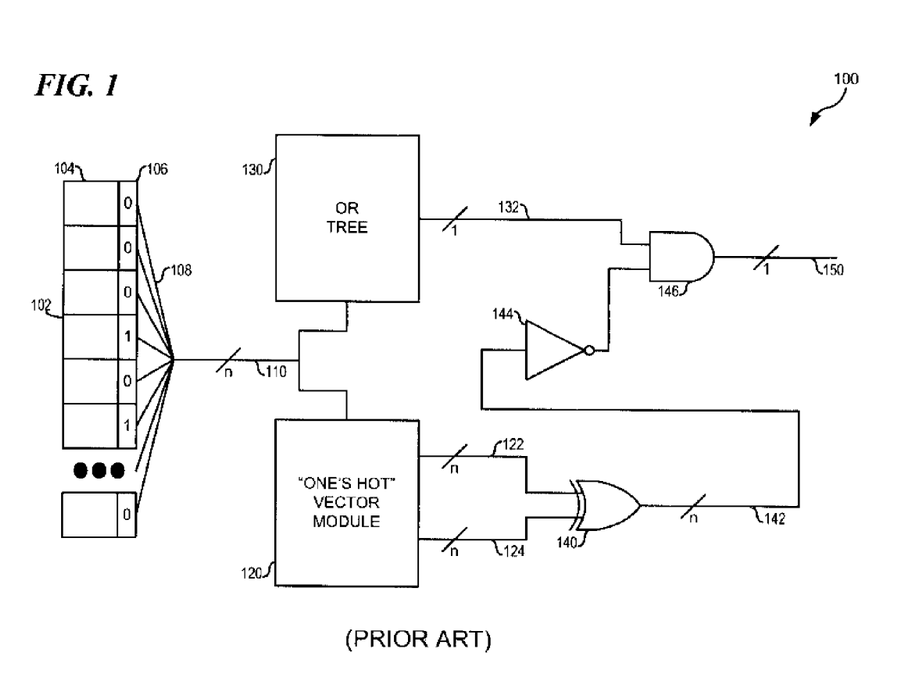
FIG. 1 illustrates a block diagram showing aspects of a common computer system in accordance with the Prior Art.

Referring now to FIG. 1, which depicts a block diagram illustrating a prior art computer system, a computer system 100 includes a registry file 102. Registry file 102 is an otherwise conventional registry file, also sometimes known as a "register file," and includes a plurality of entries 104, each coupled to an associated "free" bit 106. Generally, each free bit 106 is configured in one of two states that indicate whether the associated entry 104 is empty or otherwise available to receive data. A plurality of signal lines 108 taps each of the plurality of free bits 106, coupling together to form a bus 110. As illustrated, bus 110 is n-bits wide, where n indicates the number of registry entries 104 in registry file 102.

Computer system 100 includes "One's Hot" vector (OHV) module 120. Generally, OHV module 120 couples to bus 110 and receives the plurality of signals representing the state of the free bits 106. In one embodiment, OHV module 120 traverses the plurality of signals represented by bus 110, and generates one or more vectors, each representing the state of the free bits 106 in a manner that indicates whether each entry 104 is empty or otherwise available to receive data.

One skilled in the art will understand that OHV module 120 can generate an OHV in a variety of matters, including, in one embodiment, a transformation of bus 110 into a conventional ones-hot vector. In the illustrated embodiment, OHV module 120 generates two OHVs, OHV 122 and OHV 124. OHV 122 and OHV 124 are otherwise conventional ones-hot vectors, and are n-bits wide, where n indicates the number of registry entries 104 in registry file 102.

While OHV module 120 generates OHVs that indicate which, if any, of the registry entries 104 are available to receive data, most typical computer systems 100 also require some general indication of whether there are any available entries at all. Typically, this indication is in the form of a signal, sometimes called "found one," which indicates that there is at least one free entry in registry file 102. Typical computer systems 100 use this "found one" signal for control logic.

In the illustrated embodiment, computer system 100 includes an OR tree 130 to generate a "found one" signal. Generally, OR tree 130 is a collection of otherwise conventional logic OR gates, arranged in a tree configuration. OR tree 130 couples to bus 110, and generates a "found one" signal 132 based on the states of the signals comprising bus 110. In one embodiment, "found one" signal 132 is a single bit indicating whether any of the free bits 106 are set, that is, whether there is at least one entry 104 available to receive data. One skilled in the art will understand that OR tree 130 can also generate the "found one" signal in a variety of ways in addition to or instead of by means of a collection of OR gates arranged in a tree configuration. As such, OR tree 130 generally represents these alternate means.

Additionally, some computer systems 100 require OR tree 130 to generate a "found one" signal 132 for each OHV generated by OHV module 120. For simplicity, the illustrated embodiment omits additional "found one" signals. In some embodiments, OHV module 120 comprises a separate OR tree 130 to generate a separate "found one" signal for each OHV.

One skilled in the art will understand that some computer systems 100 require an additional "found two" signal, indicating whether there are at least two entries 104 that are available to receive data. The "intuitive method" described above operates to generate a "found two" signal from OHV 122, OHV 124, and "found one" signal 132. Specifically, computer system 100 includes an exclusive OR (XOR) gate 140 coupled to OHV module 120.

Generally, XOR gate 140 is an otherwise conventional XOR gate, configured to perform a bitwise XOR function using OHV 122 and OHV 124 as inputs. XOR gate produces an n-bit wide XOR output 142. An inverter (NOT) gate 144 couples to XOR gate 140. NOT gate 144 is an otherwise conventional NOT gate or inverter, and generates an NOT output that is the logical inverse of the XOR output 142. Thus, NOT gate 144 indicates whether there are either zero or at least two free entries indicated by OHV 122 and OHV 124.

To resolve whether the NOT output indicates zero or at least two free entries, computer system 100 includes logic AND gate 146. AND gate 146 is an otherwise conventional AND gate and couples to NOT gate 144 and OR tree 130. AND gate 146 performs a logic AND function using the NOT output and "found one" signal 132 as inputs. As such, AND gate 146 generates a "found two" signal 150 that is raised when the NOT output indicates that there are either zero or two (or more) available entries, and the "found one" signal 132 indicates that there is at least one available entry in registry file 102.

More specifically, as one skilled in the art will understand, AND gate 146 will only produce a one if both of its inputs are ones. Therefore, if both of the "found one" signals are zeros, the output of the AND gate will be a zero, and the control logic will know that no empty registers have been found. If the output is a one, the control logic will know that two empty registers have been found. Subsequently, the control logic of computer system 100 (not shown) can combine the two one-hot vectors, for example, through using an OR gate (not shown).

However, this intuitive method suffers from the disadvantage of being very slow because it causes at least two delays. First, generating "found two" signal 150 using NOT gate 144 and AND gate 146 creates one delay. Second, combining the one-hot vectors OHV 122 and OHV 124 creates another delay. Furthermore, in typical systems, the entire process, generating signal 150 and combining OHV 122 and OHV 124, must be completed in one clock cycle.

But because creating the one-hot vectors takes most of one clock cycle, these additional delays may prevent the process from being competed in time. Generally, typical systems can generate "found two" signal 150 on the order of $\log_2$ n, where n indicates the number of entries 104 in registry file 102. One skilled in the art will understand that as n increases, the time required to generate the necessary "found two" signal may exceed the time allowed, thereby limiting the size of the registry file, or causing clock cycle time increases that may cause serious disruption to other system components or design problems.

Therefore, there is a need for a system and/or method for identifying free registry file entries, and for vector analysis, that addresses at least some of the problems and disadvantages associated with conventional systems and methods.

BRIEF SUMMARY

The following summary is provided to facilitate an understanding of some of the innovative features unique to the embodiments disclosed and is not intended to be a full description. A full appreciation of the various aspects of the embodiments can be gained by taking into consideration the entire specification, claims, drawings, and abstract as a whole.

It is, therefore, one aspect of the present invention to provide for an improved free registry entry determination method.

It is a further aspect of the present invention to provide for an improved free registry entry determination system.

It is a further aspect of the present invention to provide for an improved method to generate a "found two" signal in a computer system.

It is a further aspect of the present invention to provide for an improved system to generate a "found two" signal in a computer system.

It is a further aspect of the present invention to provide for an improved vector analysis system.

It is a further aspect of the present invention to provide for an improved vector analysis method.

The aforementioned aspects and other objectives and advantages can now be achieved as described herein. A method for indicating whether an n-bit vector contains at least two logic high values includes receiving an n-bit vector, wherein each bit indicates a state of an associated entity. The method arranges the n-bit vector into a plurality of first subsets, wherein each bit is a member of only one of the plurality of first subsets. The method adds the members of each first subset together, to generate a plurality of first sum signals and a plurality of first carry signals, each first sum signal associated with only one of the plurality of first subsets, and each first carry signal associated with only one of the plurality of first subsets. The method arranges the plurality of first sum signals into a plurality of second subsets, wherein each first sum signal is a member of only one of the plurality of second subsets. The method adds the members of each second subset together, to generate a plurality of second sum signals and a plurality of second carry signals, each second sum signal associated with only one of the plurality of second subsets, and each second carry signal associated with only one of the plurality of second subsets. The method generates a first OR signal based on the results of a logic OR operation using the plurality of first carry signals as inputs. The method adds the plurality of second sum signals together, to generate a final carry signal. The method generates a second OR signal based on the results of a logic OR operation using the plurality of second carry signals as inputs. And the method generating a signal indicating whether the n-bit vector includes at least two logic high values, based on the first OR signal, the second OR signal, and the final carry signal.

In an alternate embodiment, a system includes a "found two" module configured to receive an n-bit vector and to generate a "found two" signal indicating whether there are at least two bits of the n-bit vector in a predetermined state. The system also includes a "one's hot" module coupled to the "found two" module. The "one's hot" module is configured to generate, concurrently with the "found two" module, a first one's hot vector (OHV) based on the received n-bit vector.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

The particular values and configurations discussed in these non-limiting examples can be varied and are cited merely to illustrate at least one embodiment and are not intended to limit the scope of the invention.

In the following discussion, numerous specific details are set forth to provide a thorough understanding of the present invention. Those skilled in the art will appreciate that the present invention may be practiced without such specific details. In other instances, well-known elements have been illustrated in schematic or block diagram form in order not to obscure the present invention in unnecessary detail. Additionally, for the most part, details concerning network communications, electro-magnetic signaling techniques, user interface or input/output techniques, and the like, have been omitted inasmuch as such details are not considered necessary to obtain a complete understanding of the present invention, and are considered to be within the understanding of persons of ordinary skill in the relevant art.

It is further noted that, unless indicated otherwise, all functions described herein may be performed in either hardware or software, or in some combinations thereof. In a preferred embodiment, however, the functions are performed by a processor such as a computer or an electronic data processor in accordance with code such as computer program code, software, and/or integrated circuits that are coded to perform such functions, unless indicated otherwise.

The invention can take the form of an entirely hardware embodiment, an entirely software embodiment, or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer-readable medium can be any apparatus or otherwise tangible medium that can contain, store, communicate, propagate, or transport the program for use by or in connection with the instruction execution system, apparatus, or device.

The medium can be an electronic, magnetic, optical, electromagnetic, infrared, or semiconductor system (or apparatus or device). Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

Figure 2:
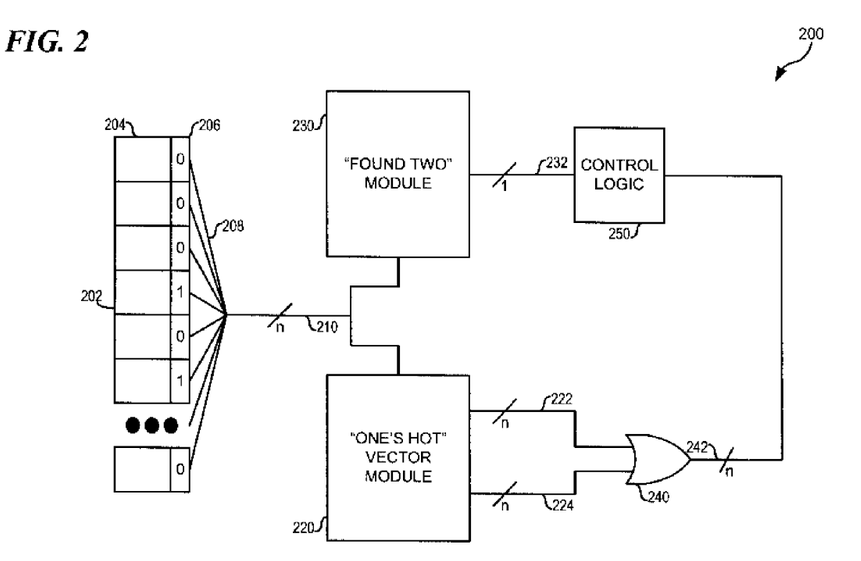
FIG. 2 illustrates a block diagram showing an improved vector analysis and free registry entry determination system in accordance with a preferred embodiment.

Referring now to the drawings, FIG. 2 is a high-level block diagram illustrating certain components of a system 200 for improved vector analysis and free registry entry determination, in accordance with a preferred embodiment of the present invention. System 200 comprises a registry file 202.

Registry file 202 is an otherwise conventional registry file and includes a plurality of entries 204, each coupled to an associated "free" bit 206. Generally, as in the prior art systems, each free bit 206 is configured in one of two states that indicate whether the associated entry 204 is empty or otherwise available to receive data. A plurality of signal lines 208 taps each of the plurality of free bits 206, coupling together to form a bus 210. As illustrated, bus 210 is n-bits wide, where n indicates the number of registry entries 204 in registry file 202.

System 200 also includes "One's Hot" vector (OHV) module 220. Generally, OHV module 220 couples to bus 210 and receives the plurality of signals representing the state of the free bits 206. In one embodiment, OHV module 220 traverses the plurality of signals represented by bus 210, and generates one or more vectors, each representing the state of the free bits 206 in a manner that indicates whether each entry 204 is empty or otherwise available to receive data.

One skilled in the art will understand that OHV module 220 can generate an OHV in a variety of matters, including, in one embodiment, a transformation of bus 210 into a conventional ones-hot vector. In the illustrated embodiment, OHV module 220 generates two OHVs, OHV 222 and OHV 224. OHV 222 and OHV 224 are otherwise conventional ones-hot vectors, and are n-bits wide, where n indicates the number of registry entries 204 in registry file 202.

Additionally, in one embodiment, OHV module 220 is further configured to generate a "found one" signal for each generated OHV. OHV module 220 generates the "found one" signals in any of a number of manners known to those skilled in the art. The illustrated embodiment depicts the "found one" signal as coexistent with the OHVs themselves. One skilled in the art will understand that OHV module 220 can also generate and transmit the "found one" signals independently.

Unlike conventional systems, system 200 includes "Found Two" module 230. Generally, "Found Two" module 230 is a circuit or circuits configured to receive the signals of bus 210 and to generate a "found two" signal based on whether there are at least two signals of bus 210 that are in a logic high state. One skilled in the art will understand that "Found Two" module 230, described in more detail below, can operate to determine whether there are two logic high signals in any suitable vector, and is not limited to n-bit vectors that describe a collection of free registry entry bits. Additionally, "Found Two" module 230 operates in parallel with OHV module 220.

In the illustrated embodiment, "Found Two" module 230 generates "found two" signal 232. In a preferred embodiment, "found two" signal 232 is a single bit signal indicating whether there are at least two signals of bus 210 that are in a logic high state. In one embodiment, as illustrated, bus 210 is a collective signal representing the free bits 206 of registry file 202. As described above, these free bits indicate whether their associated registry entry is available to receive data. As such, in the illustrated embodiment, "found two" signal 232 indicates whether there are at least two free bits 206 set high, indicating that there are at least two registry entries 204 that are available to receive data.

As illustrated, "Found Two" module 230 generates "found two" signal 232 in parallel with generation of OHVs by OHV module 220. As described in more detail below, "Found Two" module 230 typically produces "found two" signal 232 faster than OHV module 220 produces one or more OHVs. That is, generally, in one embodiment, the operation of OHV module 220 is a linear operation, while the operation of "Found Two" module 230 is a logarithmic operation. One skilled in the art will appreciate that this configuration is a significant improvement over prior art systems and methods.

System 200 also includes OR gate 240. OR gate 240 is an otherwise conventional OR gate, and is configured to perform a bitwise logic OR operation with OHV 222 and OHV 224 as inputs. OR gate 240 thus generates an n-bit combined vector 242 based on the input OHVs. In one embodiment, combined vector 242 represents the registry entries 204 identified as available to receive data. So configured, combined vector 242 is a free register vector.

In the illustrated embodiment, OR gate 240 generates combined vector 242 from two OHV inputs. In an alternate embodiment, OR gate 240 generates combined vector 242 from a plurality of OHV inputs. As described above, in a preferred embodiment, OR gate 240 generates a free register vector 242 from OHVs that represent whether the registry entries in a registry file are available to receive data.

System 200 also includes control logic 250. Control logic 250 is otherwise conventional control logic, adapted to receive "found two" signal 232 and combined vector 242. Generally, control logic 250 receives "found two" signal 232 and combined vector 242 as inputs and takes action, or directs action to be taken, based on the received inputs. For example, in one embodiment, control logic 250 selects a particular registry entry 204 to receive data based on the received inputs.

Accordingly, system 200 produces control signals "found two" signal 232, combined vector 242, and "found one" signals, based on a plurality of input signals. In the illustrated embodiment, the plurality of input signals is bus 210, which represents the collective free bits 206 of registry file 202. One skilled in the art will understand that system 200 can produce the control signals based on a plurality of input signals that indicate other information. For example, the plurality of input signals can represent the "invalid" or "dirty" bits of a cache, state or other bits in a translation look-aside buffer (TLB), or other suitable information.

Figure 3:
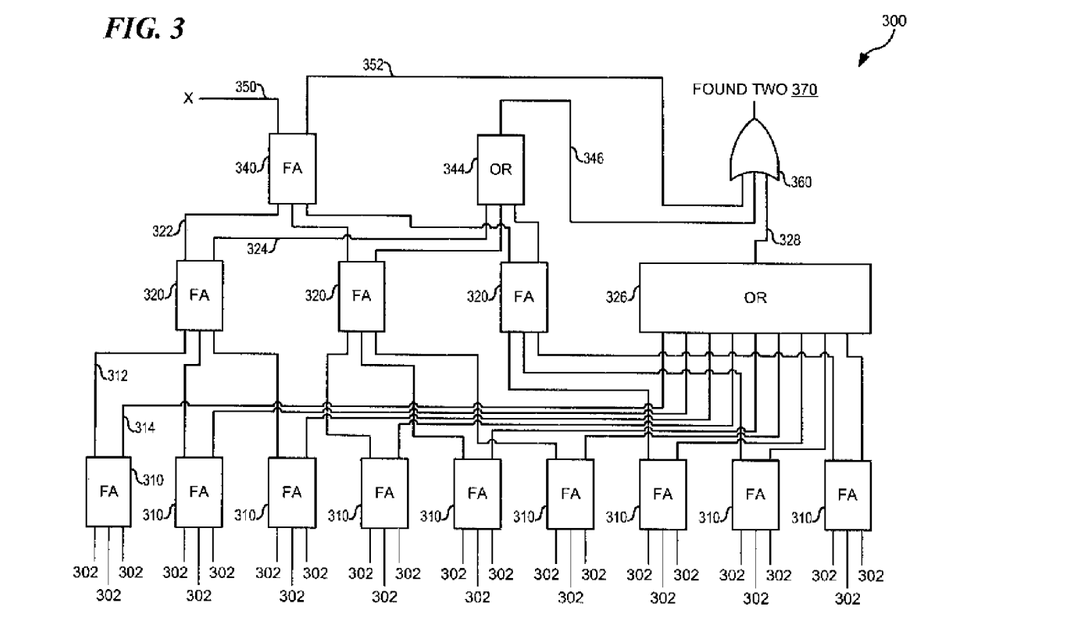
FIG. 3 illustrates a block diagram showing further detail of an improved vector analysis and free registry entry determination system in accordance with a preferred embodiment.

FIG. 3 illustrates a "Found Two" module in additional detail, in accordance with a preferred embodiment. Specifically, FIG. 3 illustrates a system 300 configured in accordance with a preferred embodiment of a "Found Two" module, such as "Found Two" module 230 of FIG. 2. As such, system 300 generally receives a plurality of inputs and generates a "Found Two" signal indicating whether at least two of the plurality of inputs is in a logic high state.

As shown, system 300 receives a plurality of inputs 302. In one embodiment, each input 302 is a single bit and represents the free bit of a registry entry in a registry file. One skilled in the art will understand that input 302 can represent any number of suitable states and/or entities.

System 300 arranges each input 302 into a subset of the plurality of inputs 302 and couples the inputs 302 into a plurality of adders 310. In this illustrated embodiment, each adder 310 is an otherwise conventional three-input full adder. Accordingly, each adder 310 generates a sum output 312 and a carry output 314 based on the states of the inputs 302 the adder 310 receives.

In the illustrated embodiment, each adder 310 is a full adder. In an alternate embodiment, one or more of the plurality of adders 310 is a half adder. Generally, system 300 includes full adders when, as illustrated, there are an odd number of inputs 302. Generally, system 300 includes one or more half adders when there is an even number of inputs 302.

System 300 arranges each sum output 312 into a subset of the plurality of sum outputs 312 and couples the sum outputs 312 into a plurality of adders 320. In the illustrated embodiment, each adder 320 is an otherwise conventional 3-input full adder. In an alternate embodiment, one or more of the plurality of adders 320 is a half adder. Each adder 320 generates a sum output 322 and a carry output 324.

System 300 arranges each sum output 322 into a subset of the plurality of sum outputs 322 and couples the sum outputs 322 into a plurality of adders 340. In the illustrated embodiment, each adder 340 is an otherwise conventional 3-input full adder. In an alternate embodiment, one or more of the plurality of adders 340 is a half adder. Each adder 340 generates a sum output 350 and a carry output 324.

In the illustrated embodiment, system 300 includes three sum outputs 322 and therefore the plurality of adders 340 comprises a single adder 340. In alternate embodiments, the number of adders 340, adders 320, and adders 310 depends on the number of inputs 302. In the illustrated embodiment, there are twenty-seven inputs 302, nine adders 310, three adders 320, and one adder 340. One skilled in the art will understand that system 300 can also include additional layers of adders, according to the principles illustrated in FIG. 3.

System 300 couples each of the plurality of carry outputs 314 into an OR module 326. OR module 326 is an otherwise conventional multi-input OR gate (or gates) and is configured to receive the plurality of carry outputs 314 as inputs, and to generate an OR output 328 based on the received inputs.

Similarly, system 300 couples each of the plurality of carry outputs 324 into an OR module 344. OR module 344 is an otherwise conventional multi-input OR gate (or gates) and is configured to receive the plurality of carry outputs 324 as inputs, and to generate an OR output 346 based on the received inputs.

System 300 couples carry output 352, OR output 346, and OR output 328 into an OR module 360. OR module 360 is an otherwise conventional multi-input OR gate (or gates) and is configured to receive the carry output 352, OR output 346, and OR output 328 as inputs, and to generate a "Found Two" signal 370 based on the received inputs. In the illustrated embodiment, system 300 ignores sum output 350. As such, in an alternate embodiment, adder 340 does not generate sum output 350.

Accordingly, system 300 receives a plurality of inputs 302, and, through various levels of adders 310, 320, 340, and OR modules 326, 344, and 360 generates a "found two" signal 370 that indicates whether at least two of inputs 302 are logic high inputs. In particular, the first level adders 310 generate sum signals 312 and carry signals 314. The second level adders 320 add the sum signals 312, generating sum signals 322, which are added by the third level adder 340. OR module 326 operates on carry signals 314 to generate OR output 328 and OR module 344 operates on carry signals 324 to generate OR output 346.

That is, each adder produces a sum signal that is logic high when either one or three of its inputs are logic high. Further, each adder produces a carry signal that is logic high when two or three of its inputs are logic high. Thus, generally, each level's sum outputs are the next level's adder inputs (if any), and each level's carry outputs are OR'd together into a single bit result, which passes as an input to the final OR module. As such, one skilled in the art will understand that in embodiments with more than three levels, each level conforms to the general description above.

So configured, where there are at least two logic high inputs among the plurality of inputs 302, "found two" signal 370 will be at logic high. In the event that at least two of the plurality of inputs 302 are at logic high, the adders will pass along logic high sum signals that are collected by the final adder 340. If there are two logic high signals in different first subsets, final adder 340 will generate a logic high carry signal 352, and OR module 360 will generate a logic high "found two" signal 370. Similarly, if there are two logic high signals in the same first or second subset, one of the earlier carry signals will be logic high, and one of OR output 328 or OR output 346 will be logic high. If either (or both) of OR output 328 or OR output 346 are logic high, OR module 360 will generate a logic high "found two" signal 370. As such, system 300 generates a logic high "found two" signal 370 whenever at least two of the plurality of inputs 302 are at logic high.

Figure 4:
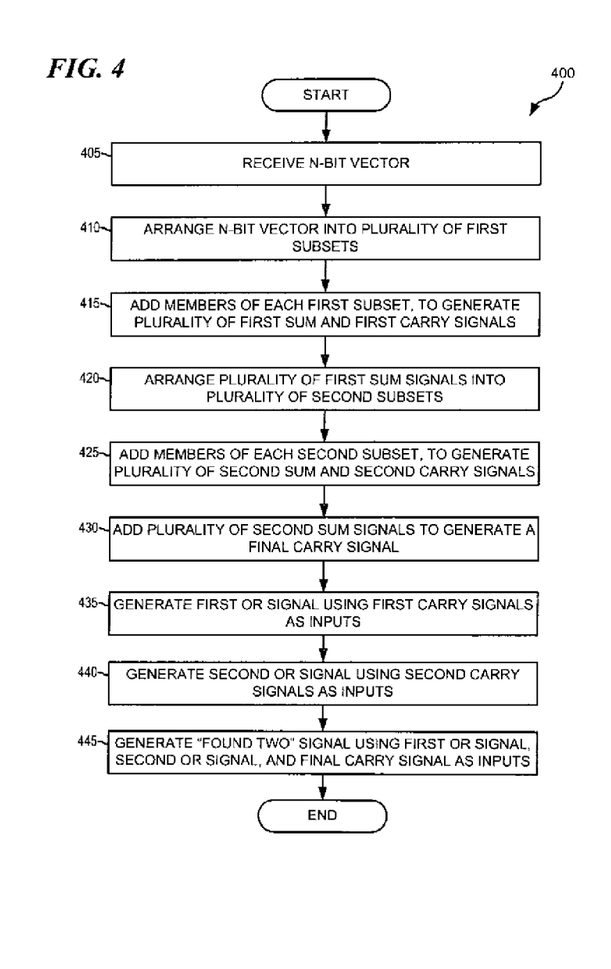
FIG. 4 illustrates a high-level flow diagram depicting logical operational steps of an improved vector analysis and free registry entry determination method, which can be implemented in accordance with a preferred embodiment.

FIG. 4 illustrates one embodiment of a method for vector analysis and improved free registry file entry determination. Specifically, FIG. 4 illustrates a high-level flow chart 400 that depicts logical operational steps performed by, for example, system 200 of FIG. 2, which may be implemented in accordance with a preferred embodiment. Generally, "Found Two" module 230 of FIG. 2 performs the steps of the method, unless indicated otherwise.

As indicated at block 405, the process begins, wherein "Found Two" module 230 receives an n-bit vector. As described above, the n-bit vector can be a bus comprising a plurality of signals. Next, as illustrated at block 410, "Found Two" module 230 arranges the n-bit vector into a plurality of first subsets. For example, system 300 of FIG. 3 includes adders 310 that each receives three inputs 302.

Next, as indicated at block 415, "Found Two" module 230 adds members of each first subset, to generate a plurality of first sum signals and first carry signals. For example, adders 310 generate sum signals 312 and carry signals 314. Next, as indicated at block 420, "Found Two" module 230 arranges the plurality of first sum signals into a plurality of second subsets. For example, system 300 includes adders 320 that each receive three sum signals 312.

Next, as indicated at block 425, "Found Two" module 230 adds members of each second subset, to generate a plurality of second sum signals and second carry signals. For example, adders 320 generate sum signals 322 and carry signals 324 based on sum signals 312. Next, as indicated at block 430, "Found Two" module 230 adds the plurality of second sum signals to generate a final carry signal. For example, adder 340 generates carry signal 352 based on sum signals 322.

Next, as illustrated at block 435, "Found Two" module 230 generates a first OR signal using the first carry signals as inputs. For example, OR module 326 generates OR output 328 based on carry signals 314. Next, as illustrated at block 340, "Found Two" module 230 generates a second OR signal using the second carry signals as inputs. For example, OR module 344 generates OR output 346 based on carry signals 324.

Next, as illustrated at block 445, "Found Two" module 230 generates a "Found Two" signal using the first OR signal, the second OR signal, and the final carry signal as inputs, and the process ends. For example, OR module 360 generates "found two" signal 370 based on OR output 328, OR output 346, and final carry signal 352.

Accordingly, the disclosed embodiments provide numerous advantages over other methods and systems. First, as described above, the "Found Two" module disclosed herein generates a "found two" in parallel with generation of "one's hot" vectors based on the same n-bit input. Generally, generating the "found two" signal is a logarithmic operation, which is faster than the linear operation of generating the "one's hot" vectors. As such, in systems relying on a "found two" signal, the "found two" module reduces delay at least below any delay introduced by generating the "one's hot" vectors. One skilled in the art will appreciate that this configuration is a significant improvement over prior art systems and methods.

Additionally, the disclosed "Found Two" module generates the "found two" signal faster than conventional systems and methods. For example, the "intuitive" prior art approach described above operates to generate a "found two" signal on the order of $\log_2 n$, where n is the number of bits in the n-bit vector. The "Found Two" module of the present invention, however, generates a "found two" signal on the order of $\log_3 n$, which one skilled in the art will recognize as a significant improvement over the intuitive approach. Additionally, as n increases, the present invention outperforms conventional systems to an even greater degree.

One skilled in the art will appreciate that variations of the above-disclosed and other features and functions, or alternatives thereof, may be desirably combined into many other different systems or applications. Additionally, various presently unforeseen or unanticipated alternatives, modifications, variations or improvements therein may be subsequently made by those skilled in the art, which are also intended to be encompassed by the following claims.

What is claimed is:

1. A method for indicating whether an n-bit vector contains at least two logic high values, comprising:
   receiving an n-bit vector, wherein each bit indicates a state of an associated entity;
   arranging the n-bit vector into a plurality of first subsets, wherein each bit is a member of only one of the plurality of first subsets;
   adding the members of each first subset together, to generate a plurality of first sum signals and a plurality of first carry signals, each first sum signal associated with only one of the plurality of first subsets, and each first carry signal associated with only one of the plurality of first subsets;
   arranging the plurality of first sum signals into a plurality of second subsets, wherein each first sum signal is a member of only one of the plurality of second subsets;
   adding the members of each second subset together, to generate a plurality of second sum signals and a plurality of second carry signals, each second sum signal associated with only one of the plurality of second subsets, and each second carry signal associated with only one of the plurality of second subsets;
   generating a first OR signal based on the results of a logic OR operation using the plurality of first carry signals as inputs;
   adding the plurality of second sum signals together, to generate a final carry signal;
   generating a second OR signal based on the results of a logic OR operation using the plurality of second carry signals as inputs; and
   generating a signal indicating whether the n-bit vector includes at least two logic high values, based on the first OR signal, the second OR signal, and the final carry signal.

2. The method of claim 1, wherein the associated entity is a registry file entry of a plurality of registry file entries in a registry file.

3. The method of claim 1, wherein receiving an n-bit vector comprises receiving n signals and generating the n-bit vector based on the received n signals.

4. The method of claim 1, wherein the signal indicating whether the n-bit vector includes at least two logic high values is configured as a "found two" signal suitable for registry file control logic.

5. The method of claim 1, wherein generating a signal indicating whether the n-bit vector includes at least two logic high values comprises a logic OR operation using the first OR signal, the second OR signal, and the final carry signal as inputs.

6. A computer program product comprising a non-transitory computer-readable medium with a computer program embodied thereon, the computer program comprising:
 computer code for receiving an n-bit vector, wherein each bit indicates a state of an associated entity;
 computer code for arranging the n-bit vector into a plurality of first subsets, wherein each bit is a member of only one of the plurality of first subsets;
 computer code for adding the members of each first subset together, to generate a plurality of first sum signals and a plurality of first carry signals, each first sum signal associated with only one of the plurality of first subsets, and each first carry signal associated with only one of the plurality of first subsets;
 computer code for arranging the plurality of first sum signals into a plurality of second subsets, wherein each first sum signal is a member of only one of the plurality of second subsets;
 computer code for adding the members of each second subset together, to generate a plurality of second sum signals and a plurality of second carry signals, each second sum signal associated with only one of the plurality of second subsets, and each second carry signal associated with only one of the plurality of second subsets;
 computer code for generating a first OR signal based on the results of a logic OR operation using the plurality of first carry signals as inputs;
 computer code for adding the plurality of second sum signals together, to generate a final carry signal;
 computer code for generating a second OR signal based on the results of a logic OR operation using the plurality of second carry signals as inputs; and
 computer code for generating a signal indicating whether the n-bit vector includes at least two logic high values, based on the first OR signal, the second OR signal, and the final carry signal.

7. The processor of claim 6, wherein the associated entity is a registry file entry of a plurality of registry file entries in a registry file.

8. The processor of claim 6, wherein receiving an n-bit vector comprises receiving n signals and generating the n-bit vector based on the received n signals.

9. The processor of claim 6, wherein the signal indicating whether the n-bit vector includes at least two logic high values is configured as a "found two" signal suitable for registry file control logic.

10. The processor of claim 6, wherein generating a signal indicating whether the n-bit vector includes at least two logic high values comprises a logic OR operation using the first OR signal, the second OR signal, and the final carry signal as inputs.

11. A hardware system, comprising:
 a "found two" module configured to receive an n-bit vector and to generate a "found two" signal indicating whether there are at least two bits of the n-bit vector in a predetermined state; and
 a "one's hot" module coupled to the "found two" module, the "one's hot" module configured to generate, concurrently with the "found two" module, a first one's hot vector (OHV) based on the received n-bit vector;
 wherein the "found two" module further comprises:
 a first plurality of adders configured to receive the n-bit vector;
 wherein each adder of the first plurality of adders receives a first subset of the bits of the n-bit vector of a plurality of first subsets and each bit is a member of only one of the plurality of first subsets;
 wherein the first plurality of adders adds the members of each first subset together, to generate a plurality of first sum signals and a plurality of first carry signals, each first sum signal associated with only one of the plurality of first subsets, and each first carry signal associated with only one of the plurality of first subsets;
 a second plurality of adders coupled to the first plurality of adders and configured to receive the plurality of first sum signals;
 wherein each adder of the second plurality of adders receives a second subset of the plurality of first sum signals, wherein each first sum signal is a member of only one of the plurality of second subsets;
 wherein the second plurality of adders adds the members of each second subset together, to regenerate a plurality of second sum signals and a plurality of second carry signals, each second sum signal associated with only one of the plurality of second subsets, and each second carry signal associated with only one of the plurality of second subsets;
 a first OR gate coupled to the first plurality of adders and configured to regenerate a first OR signal based on the results of a logic OR operation using the plurality of first carry signals as inputs;
 a third plurality of adders configured to add the plurality of second sum signals together, to regenerate a final carry signal;
 a second OR gate coupled to the second plurality of adders and configured to regenerate a second OR signal based on the results of a logic OR operation using the plurality of second carry signals as inputs; and
 a third OR gate coupled to the second OR gate and the third plurality of adders and configured to regenerate the "found two" based on the first OR signal, the second OR signal, and the final carry signal.

12. The system of claim 11, wherein each bit of the n-bit vector indicates whether an associated registry file entry is available to receive data.

13. The system of claim 11, wherein the "one's hot" module is further configured to generate a second OHV based on the received n-bit vector.

14. The system of claim 13, further comprising an OR gate configured to perform a logic OR operation using the first OHV and the second OHV as inputs, to generate a free register vector.

15. The system of claim 13, further comprising control logic configured to receive the free register vector and the "found two" signal, wherein the control logic is configured to allocate data to a register file based on the received free register vector and the "found two" signal.

* * * * *